United States Patent [19]

Onuki et al.

[11] 4,234,523
[45] Nov. 18, 1980

[54] ADJUSTMENT PREVENTION MECHANISM FOR CARBURETOR

[75] Inventors: Keiichi Onuki, Hitachi; Tohru Nakagawa, Mito; Shigeyuki Kenma, Katsuta, all of Japan

[73] Assignee: Hitachi, Ltd., Japan

[21] Appl. No.: 2,800

[22] Filed: Jan. 11, 1979

[30] Foreign Application Priority Data

Jan. 11, 1978 [JP] Japan .................. 53-1139

[51] Int. Cl.³ .............................................. F02M 3/08
[52] U.S. Cl. .................................. 261/41 D; 137/71; 137/382; 137/384; 261/DIG. 38
[58] Field of Search ............ 261/DIG. 38, 41 D; 137/384, 382, 382.5, 71

[56] References Cited

U.S. PATENT DOCUMENTS

| | | | |
|---|---|---|---|
| 1,231,164 | 6/1917 | Jahns et al. | 137/384 |
| 1,590,032 | 6/1926 | Jauch | 137/384 |
| 1,591,222 | 7/1926 | Marrier | 137/384 |
| 2,033,371 | 3/1936 | Benaggio | 137/384 |
| 2,618,473 | 11/1952 | Whitford | 261/DIG. 38 |
| 2,779,436 | 1/1957 | Schorer | 261/DIG. 38 |
| 3,409,277 | 11/1968 | Reise | 261/71 |
| 3,454,264 | 7/1969 | Sarto | 261/41 D |
| 4,052,490 | 10/1977 | Fedison | 261/71 |
| 4,097,561 | 6/1978 | Seki et al. | 261/DIG. 38 |
| 4,120,918 | 10/1978 | Codling | 261/DIG. 38 |

FOREIGN PATENT DOCUMENTS

| | | | |
|---|---|---|---|
| 2548226 | 5/1976 | Fed. Rep. of Germany | 261/DIG. 38 |
| 543094 | 8/1922 | France | 137/382 |
| 1153151 | 3/1958 | France | 137/384 |
| 47-42424 | 8/1970 | Japan | 261/DIG. 38 |
| 50-35540 | 4/1975 | Japan | 261/DIG. 38 |
| 1236696 | 6/1971 | United Kingdom | 261/41 D |

Primary Examiner—Tim R. Miles
Attorney, Agent, or Firm—Craig & Antonelli

[57] ABSTRACT

An adjustment prevention mechanism comprises a stationary covering member disposed opposite to a head of an adjusting screw for adjusting fuel flowing in a slow speed fuel passage in idling of an engine, and a cap-shaped plug. The stationary covering member is secured to something within an engine room, for example a suction pipe of the engine, and has a hole through which the adjusting screw is adjusted. The cap-shaped plug is inserted rigidly in the hole to blockage the hole after the adjusting screw was adjusted, so that the adjusting screw can not be readjusted by usual users after the engine is transferred to the users.

8 Claims, 2 Drawing Figures

ADJUSTMENT PREVENTION MECHANISM FOR CARBURETOR

BACKGROUND OF THE INVENTION

This invention relates to an adjustment prevention mechanism of a carburetor provided with a adjustment device for adjusting idling revolution or air-fuel ratio.

As known, carburetors of gasoline engines as used, for example, in automobiles are provided with air-fuel ratio control devices such as devices for adjusting fuel in idling. Such adjustment devices are adjusted so that the air-fuel ratio will be most suitable for idling, by carburetor makers, automobile makers, or automobile sale dealers. However, there are instances where the adjustment devices are readjusted so that the precisely adjusted air-fuel ratio will become improper after transferred to users. As the results, dangers such as an increase of harmful components of exhaust gas from an engine, improper engine operation, or increased expenditure of fuel may be brought about.

In Japanese Laying-open of Patent Application No. 35540/1975, two means for preventing readjustment of the above mentioned adjustment device, such as an adjusting screw are disclosed. In one of the means shown in FIG. 1 of the Japanese application, a cap 13 is provided on a head 9 of an adjusting screw 6 so that the cap can be rotated relatively to the head 9. The Japanese Laying-open discloses that even if users rotate the cap 9, the adjusting screw 6 is not rotated because torque of the cap 9 is not transmitted to the adjusting screw 6 whereby the readjustment of the means by the users is prevented. However, with this arrangement there is a danger that the cap 13 may be pulled out from the head 9 of the screw 6, or that rotation of the cap 13 may follow that of the screw 6 if the cap 13 is fairly strongly clutched. Another means for preventing readjustment of the adjustment device is described in FIG. 2, 3 and 4 of the above-mentioned Japanese application. This arrangement has a finger-shaped element 16 on the cap 13a. The element 16 is inserted in a hole 17 made in a side wall of a carburetor body so that the cap 13a is not rotated. However, the means also has a danger such that the cap 13a may pulled out from the head 9 of the screw 6.

Thus, there is no readjustment prevention mechanism which can satisfactorily prevent the readjustment of the adjustment device by users.

SUMMARY OF THE INVENTION

An object of the invention is to provide an adjustment prevention mechanism for a carburetor which can prevent adjusting of an adjustment device of the carburetor by users.

Another object of the invention is to provide an adjustment prevention mechanism for a carburetor by which an adjustment device of the carburetor can not be operated without disassembling of the carburetor from an engine after the adjustment device is adjusted.

Briefly stated, a feature of the invention is that means for preventing readjustment of an adjustment device for adjusting idling revolution or an air-fuel ratio after a carburetor is mounted on an engine and the adjustment device of the carburetor is adjusted is provided facing the adjustment device, whereby usual users can not readjust the adjustment device.

DESCRIPTION OF THE PREFERRED EMBODIMENT

An embodiment of an adjustment prevention mechanism of a carburetor according to the invention will be described hereinafter in detail, referring to FIGS. 1 and 2.

Figure 1:
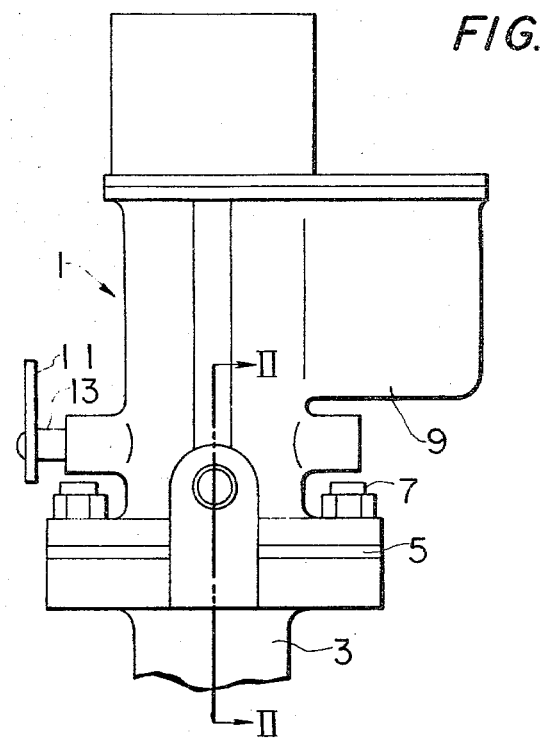
FIG. 1 is a front view of a carburetor mounted on a suction pipe which includes an embodiment of an adjustment prevention mechanism for the carburetor according to the invention.

In FIG. 1, a carburetor body 1 having a throttle valve therein is secured to a suction pipe 3 through a packing 5 with bolt and nut means 7. A float chamber 9 is provided on the upper portion of the carburetor body 1, and a throttle lever 11 is mounted on the carburetor body 1 at the lower portion thereof. The throttle lever 11 is mechanically connected to the throttle valve through a rod 13.

Figure 2:
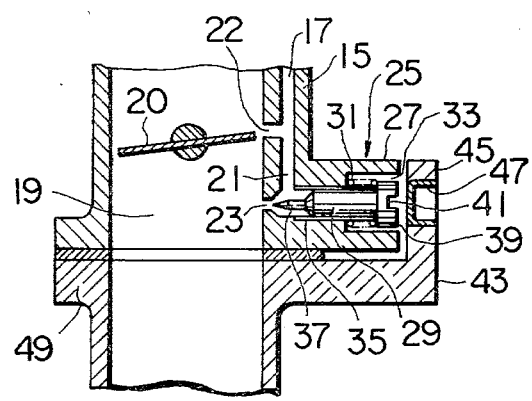
FIG. 2 is a section view taken along a line II—II of FIG. 1.

In FIG. 2, there are shown parts of the interior of of the carburetor body 1 and the suction pipe 3. In the side wall 15 of the carburetor body 1 a fuel passage 17 is formed which communicates with the float chamber 9 and an air-fuel induction passage 19 at a position 22 of the throttle valve 20. A slow speed fuel passage 21 is branched from the fuel passage 17 and communicates with the air-fuel induction passage 19 through an opening 23 of the slow speed fuel passage 21. An adjustment devices 25 for adjusting the opening degree of the opening 23 is provided on the side wall 15 and comprises a boss 27 projecting from the side wall 15, an adjusting screw 29 and a compression spring 31. The boss 27 has a recess 33 and a threaded hole 35. The adjusting screw 29 is provided with a needle 37 at its end portion and a head 39 at the other end. The needle 37 is in alignment with the opening 23 and axially moved by rotating the adjusting screw 29. The head 39 of the adjusting thread 29 is provided with a recess 41 for fitting driving means such as a screw driver to rotate the adjusting screw 29. The compression spring 31 is put between the bottom portion of the recess 33 and the head 39 to fixedly mount the adjusting screw 29 on the boss 27. A part of the adjustment device 25 such as the head 39 of the adjusting screw 29 is exposed to the atmosphere to be operated by operators out of the adjustment device 25.

A stationary covering member 43 is disposed opposite to the screw head 39 of the adjusting screw 29. The stationary covering member 43 is provided on the suction pipe 3, and has a hole 45 formed at a position of the member 43 corresponding to the screw head 39. The adjusting screw 29 is operated by an operator with a tool such as the screwdriver through the hole 45. The member 43 has a plug 47 rigidly inserted in the hole 45 after the adjustment device 25 is adjusted. The plug 47 is made of metal sheet by press-working, and shaped caplike. The press-formed caplike plug 47 is light in weight and has a spring action so that once it is inserted, it is not easy to take out.

The stationary covering member 43 may be secured to a flange 49 of the suction pipe 3 by welding means. Further it may be a member which is separated from the carburetor body 1 and secured to an engine or an engine room containing it therein.

The adjustment device 25 of the carburetor body 1 is roughly adjusted before the carburetor body 1 is mounted on the suction pipe 3 so that opening degree of the opening 23 will be proper for obtaining proper air-fuel ratio in the engine. After mounted on the suction pipe 3, the adjustment device 25 is precisely adjusted by rotating the adjusting screw 29 with the screwdriver passing through the hole 45 of stationary covering member 43 so that an appropriate quantity of fuel flows in the slow speed fuel passage 25 for obtaining suitable air-fuel ratio in the engine in idling. After the adjusting screw 29 is precisely adjusted, the hole 45 for the adjustment operation is blocked by rigidly inserting the plug 47, so that the adjusting screw 29 is not operated by any one without disassembling the carburetor body 1 from the suction pipe 3 or breaking the plug 47.

With this construction, the adjustment device 25 can not be easily readjusted by any user after the carburetor body 1 assembled on the engine is transferred to users.

For readjusting the adjustment device 25 by makers, the carburetor body 1 is disassembled from the suction pipe 3, and then the plug 47 is taken off from the stationary covering member 43 to operate the adjusting screw 29.

As above, according to the adjustment prevention mechanism of the carburetor according to the invention, the adjustment of the adjustment device of the carburetor body for example by usual users other than makers or sellers is impossible, so that an increase of harmful substances in the exhaust gas, waste consumption of fuel, or danger such that the engine runs out of order can be avoided.

What is claimed is:

1. Apparatus for preventing unauthorized readjustment of an adjustment device of a carburetor, comprising:
    blocking means disposed opposite to the adjustment device,
    adjustment accommodating means on said blocking means for accommodating adjustment of the adjustment device,
    and adjustment preventing means forming part of said blocking means and being mountable on said blocking means after an adjustment operation to thereby prevent unauthorized readjustment of said adjustment device, wherein said adjustment device of said carburetor adjusts the amount of fuel supplied from a slow speed fuel passage to an air-fuel induction passage of the carburetor,
    wherein said blocking means is formed as a stationary covering member supported independently from the carburetor body and disposed so as to face an operating portion of the adjustment device of the carburetor body,
    wherein the adjustment accommodating means is a hole through said covering member for accommodating insertion and operation of an adjustment means therethrough, and
    wherein said adjustment preventing means is a plug rigidly insertable in said hole to prevent the usual users from operating the adjustment means.

2. Apparatus according to claim 1, wherein said stationary covering member is secured to a stationary part in an engine room.

3. Apparatus according to claim 1, wherein said stationary part is a suction pipe on which the carburetor body is mounted, said stationary covering member being provided on a flange portion of said suction pipe, said plug being constructed to preclude ready access to said adjustment device without removal of said carburetor body from said suction pipe.

4. Apparatus according to claim 1, wherein said stationary covering member is a part of a suction pipe on which the carburetor is mounted.

5. Apparatus according to claim 2 or 3 or 4, wherein said plug is cup-shaped, and a bottom portion of said cup-shaped plug faces the operating portion of the adjustment means and a hollow of a cup-shaped plug faces outwardly when in an installed adjustment preventing position.

6. An adjustment prevention mechanism for a carburetor mounted on a suction pipe directing an air-fuel mixture to an engine, provided with an air-fuel induction passage, a throttle valve, a sidewall in which there is formed a slow speed fuel passage for supplying fuel into the air-fuel induction passage in idling operation of the engine, and an adjusting screw with a needle for adjusting fuel flowing into the air-fuel induction passage, passing through the slow speed fuel passage by rotation of the adjusting screw, which adjustment prevention mechanism comprises:
    a boss projecting out of the carburetor from the sidewall of a carburetor, and surrounding the adjusting screw:
    a fixed covering member for covering the adjusting screw, said covering member having a hole for operating the adjusting screw and being supported independently of said carburetor; and
    a plug rigidly inserted into said hole after the adjusting screw is adjusted precisely, said plug serving to prevent readjustment of said adjusting screw.

7. Apparatus according to claim 6, wherein said plug is cap-shaped, and said plug is inserted into said hole of said fixed covering member so that the bottom of said cap-shaped plug will face a head of the adjusting screw whereby easy removal of said plug is facilitated only by unmounting said carburetor from said suction pipe.

8. Apparatus according to claim 6, wherein said fixed covering member is extended from a flange portion of the suction pipe.

* * * * *